US012239603B2

(12) United States Patent
Restiano et al.

(10) Patent No.: US 12,239,603 B2
(45) Date of Patent: Mar. 4, 2025

(54) MOBILIZATION TOOL PERSONAL CARE PRODUCT CONTAINER

(71) Applicant: SORSOAP LLC, Brick, NJ (US)

(72) Inventors: David Restiano, Brick, NJ (US); Daniel P. Staats, Point Pleasant, NJ (US); Alfred Colantoni, Jr., Wall, NJ (US); Kenneth F. Florek, Colts Neck, NJ (US)

(73) Assignee: SORSOAP LLC, Brick, NJ (US)

( * ) Notice: Subject to any disclaimer, the term of this patent is extended or adjusted under 35 U.S.C. 154(b) by 721 days.

(21) Appl. No.: 16/832,655

(22) Filed: Mar. 27, 2020

(65) Prior Publication Data

US 2021/0298987 A1 Sep. 30, 2021

(51) Int. Cl.
*A61H 7/00* (2006.01)
*A45D 34/04* (2006.01)
*A45D 40/26* (2006.01)

(52) U.S. Cl.
CPC ............. *A61H 7/003* (2013.01); *A45D 34/04* (2013.01); *A45D 40/26* (2013.01); *A61H 2201/102* (2013.01); *A61H 2201/105* (2013.01); *A61H 2201/1253* (2013.01); *A61H 2201/1692* (2013.01); *A61H 2201/1695* (2013.01)

(58) Field of Classification Search
CPC ........ A45D 34/04; A45D 40/26; A61H 1/008; A61H 7/003; A61H 39/04; A61H 2201/0153; A61H 2201/102; A61H 2201/105; A61H 2201/1253; A61H 2201/1692; A61H 2201/1695
See application file for complete search history.

(56) References Cited

U.S. PATENT DOCUMENTS

| | | | | | |
|---|---|---|---|---|---|
| 3,754,548 | A * | 8/1973 | McGrath ............ | A61H 23/0218 | 601/17 |
| 4,485,807 | A * | 12/1984 | Gueret ................... | A61H 7/003 | 601/154 |
| 4,492,223 | A * | 1/1985 | Burke .................... | A61H 15/02 | 601/129 |
| 5,105,802 | A * | 4/1992 | Pokorny ............ | A61H 15/0085 | 601/154 |
| 5,131,384 | A * | 7/1992 | Obagi .................... | A61H 15/02 | 601/154 |
| 5,520,617 | A * | 5/1996 | Wei .......................... | A61H 7/00 | 601/134 |
| 5,944,032 | A * | 8/1999 | Masterson ............... | A47K 7/03 | 30/34.05 |

(Continued)

FOREIGN PATENT DOCUMENTS

DE 10342127 A1 * 4/2005 ............. A45D 34/04

OTHER PUBLICATIONS

Salt Leaf CBD Massager Product Sheet.

(Continued)

*Primary Examiner* — Colin W Stuart
*Assistant Examiner* — Matthew D Ziegler
(74) *Attorney, Agent, or Firm* — Florek & Endres PLLC

(57) ABSTRACT

A container comprising a cavity for holding a personal care product, an opening for dispensing the personal care product and a working feature for activation of soft tissue, the working feature being a structural feature as found on a physical therapy soft tissue mobilization tool that is adapted to mobilize soft tissue.

17 Claims, 5 Drawing Sheets

(56) References Cited

U.S. PATENT DOCUMENTS

| | | | | |
|---|---|---|---|---|
| 6,241,696 | B1 * | 6/2001 | York | A61H 15/0092 601/131 |
| 6,588,964 | B1 * | 7/2003 | Au | A45D 24/22 401/28 |
| 6,887,211 | B1 | 5/2005 | Sevier et al. | |
| 7,168,873 | B2 * | 1/2007 | Shawan | A61H 15/0092 601/129 |
| 7,628,559 | B2 * | 12/2009 | Petit | A45D 33/12 401/126 |
| 8,302,615 | B2 * | 11/2012 | Thiebaut | A45D 40/261 401/137 |
| 8,792,781 | B1 * | 7/2014 | Randall | A47J 31/56 392/445 |
| 8,801,642 | B1 | 8/2014 | Slominski | |
| 9,023,078 | B2 | 5/2015 | Dehors | |
| 9,326,642 | B1 * | 5/2016 | Williams | A46B 11/0013 |
| 9,700,480 | B2 | 7/2017 | Fiore | |
| 10,111,725 | B2 | 10/2018 | van Den Dries et al. | |
| 10,259,609 | B2 * | 4/2019 | Kuhar | B65D 1/0261 |
| 10,434,032 | B2 | 10/2019 | Ghosh et al. | |
| D884,912 | S * | 5/2020 | Oh | D24/215 |
| D919,445 | S * | 5/2021 | VanderWoude | D9/726 |
| 2007/0095861 | A1 * | 5/2007 | Yates | B05B 11/0056 222/323 |
| 2007/0191745 | A1 | 8/2007 | Tucker | |

OTHER PUBLICATIONS

The Edge Mobility System, Edge Mobility Tool, http://www.edgemobilitysystem.com/collections/best-sellers/products/edge-mobility-tool.

Rock Tape, Rockblades 2.0—Complete Soft Tissue IASTM System, http://shop.rocktape.com/rockblades-2-0-complete-soft-tissue-iastm-system/.

* cited by examiner

MOBILIZATION TOOL PERSONAL CARE PRODUCT CONTAINER

FIELD OF THE INVENTION

The present invention relates to the fields of mobilization tools and containers for personal care products including soaps, lotions, balms, emollients, oils, creams, shampoos, conditioners and the like.

BACKGROUND OF THE INVENTION

Hand held soft tissue mobilization or manipulation tools, sometimes referred to as Graston tools, hereinafter "mobilization tools," are known to physical therapists for treating a variety of physical issues. These mobilization tools are sometimes described as for the practice of the ancient gua sha principals as well as for modern physical therapy modalities.

Some commercial examples of mobilization tools currently known in the art include the RODEREK IASTM Therapy Tool, the EDGE Mobility Tool, MYOFASCIAL TOOLS Stainless Steel Multipurpose IASTM Tool, the STICKON' IASTM Tool (G Shape), the EDGEility plastic tool by EDGE Mobility, and the STARR tool. Additional examples of mobilization tools are shown in FIG. 1, including mobilization tools that come in different shapes and sizes for mobilizing and manipulating soft tissue in different areas, for mobilizing and manipulating different types of soft tissue, based on the personal preference of the user, etc.

Mobilization tools are also the subject of various patents and published patent applications. Variations are shown and described in U.S. Pat. Nos. 6,887,211, 8,801,642, 9,023,078, 9,700,480, and 10434032. Other variations are found in US Patent Application Publication Nos. US2006/0004312, US2006/0247563, 2007/0191745, US2016/0166459, US2018/0333323, US2018/0338884, and US2019/0008716, and the like, with such devices generally found in U.S. Patent Classification A61H7/001 and A61H7/003.

Known soft tissue mobilization tools are generally made of stainless steel, aluminum, plastic, stone, jade, or combinations thereof. Soft tissue mobilization tools made of these materials are most often used with a lubrication and/or emollient applied to the skin surface in the treatment area as lubrication for facilitating movement of the mobilization tool across the user's skin. All such lubricating compositions and materials will be referred to herein as "lotions."

Some of the common conditions treated with mobilization tools include ankle pain (Achilles tendinosis/itis), wrist pain (carpal tunnel syndrome), neck pain (cervical sprain/strain), fibromyalgia, hamstring injuries, hip pain, IT Band (Iliotibial Band), tennis elbow (lateral epicondylosis/itis), back pain (lumbar sprain/strain), golfer's elbow (medial epicondylosis/itis), knee pain (patellofemoral disorders), heel pain (plantar fasciitis), shoulder pain (rotator cuff tendinosis/itis), general muscle pain and soreness, scar tissue, trigger finger, women's health issues (post-mastectomy and caesarean scarring), to name a few.

The present invention seeks to make soft tissue mobilization tools more accessible and easier to use by the person on which the mobilization tool is being used.

SUMMARY OF THE INVENTION

The present invention is directed to a container for a personal care product such as a liquid soap, a body, hand or face lotion, a balm, an emollient, an oil, a cream, a shampoo, a conditioner and the like, the container having at least one working feature for soft tissue mobilization. As used here, "working feature" refers to a structural feature as is found on a physical therapy soft tissue mobilization tool that is adapted to mobilize soft tissue.

The preferred container has two or more surfaces, or faces, each surface having a periphery including a first end, a second end and a body between said ends, one or more sides extending between said ends at the periphery of the surfaces, and two or more corners, the corners being at changes of direction in the surface of the container. Most preferably, the container comprises opposed first and second surfaces with a side about the periphery between said first and second surfaces. The first and second surfaces preferably include a number of corners forming nubs at the transition between adjacent peripheral edges of the surfaces.

Preferably, the container has at least one peripheral section comprising a concave edge and at least one peripheral section comprising a convex edge. More preferred, the container has at least two concave or convex peripheral portions, with two concave and two convex peripheral portions being most preferred.

It is also preferred that the container has at least one acute corner when viewed looking at the front surface, where the angle of the corner is less than 90 degrees, and/or at least one obtuse corner, where the angle of the corner is greater than 90 degrees. Notwithstanding the angle, it is understood that the corners may be, and are preferably, at least partially rounded.

Additionally, the preferred container has at least one beveled section, comprising an angled transition associated with one or more sides. The beveled section may comprise two opposed bevels on the side between the front surface and the rear surface, so that the two bevels form an obtuse angle, or a single bevel. The single bevel can be either across the entire side between the front surface and the rear surface or, most preferably, on only a portion of the side and including both a portion at a substantially 90 degree angle from one of the front surface and the rear surface and a portion comprising a bevel to the other surface.

The container can have any suitable dimensions, but preferably has a length dimension from one end to the other of about 4 to 25 cm, and more preferably from about 8 to 22 cm, a height dimension of from about 4 to 22 cm, and more preferably from about 6 to 18 cm, and a depth dimension of from about 1 to 8 cm, and more preferably from about 1.5 to 6 cm. The most preferred dimensions are a length of about 12 to 18 cm, a height of about 9 to 12 cm and a depth of about 2 to 6 cm.

In a preferred embodiment, the container has at least one aperture extending between the first and second surfaces to assist in controlling the container during soft tissue mobilization. It is preferred that the size and shape of the aperture conforms to one or more of the user's fingers, to permit the user to engage the aperture with one or up to four fingers extending through the aperture to securely grasp the container.

The personal care product of the container may include a surfactant, and one or more ingredients taken from the group of a fragrance, an essential oil, an exfoliate, a moisturizer, a medicament, a UV blocker, a CBD, etc. It can be all natural, organic, vegan, hypo-allergenic and/or conforming to other standards, as desired.

For example, a personal care product made from 1%-5% menthol in a soap base of palm oil and other traditional soap ingredients is anticipated to have a beneficial effect for the user. Additional ingredients, such as a CBD for reducing inflammation, can be included in a personal care composition to further treat related conditions.

The packaging of a personal care product within the container having working features affords a synergistic effect by providing a tool for soft tissue mobilization and its own lubrication to decrease friction during use of the contents, as well as providing a cleaning function. Moreover, the use of fragrance in the personal care product provides an aromatherapy effect, eliminating the need for providing a separate scent for relaxation, stimulus, etc.

Accordingly, the preferred container for a personal care product of the present invention is well suited for use by individuals in various settings, including but not limited to a shower or bath environment, a workplace, an athletic field, a gym, etc., allowing the user to mobilize soft tissue, especially for sore muscle recovery. During such use, the user can, for example, treat sore muscle tissue using the container without the need for extra lubricants or aromatherapy scents other than those that are components of the personal care product, while cleaning themselves, making it well suited for use after a workout or participation in a sporting activity.

The container for holding a personal care product, comprises a cavity adapted to contain the personal care product and at least one working feature for soft tissue mobilization. Preferably, the container comprises a resealable opening for dispensing the personal care product. The preferred container also includes a substantially flat side or base for standing the container on a flat surface. The resealable opening for accessing the personal care product can be positioned either at the base end or spaced away from the base end, preferably at the end opposite the base end, as desired. Alternatively, the resealable opening can be incorporated into a working feature of the container.

To improve the container for the purpose of use as a manipulation tool, one or more portions of the container can have a thickened wall or solid extension in the area of a working feature.

The present container comprising a working feature may contain a body wash comprising a liquid soap composition, a body lotion, a moisturizing cream, a shampoo, a conditioner, a sunscreen, a CBD oil, etc., all of which are examples of personal care products. The liquid personal care product preferably comprises ingredients that provide lubrication, medicinal and/or fragrance characteristics during use of the personal care products.

The container is particularly well suited for use by individuals in various settings, including a shower, bath, spa, office, workplace, athletic facility, etc., environment, allowing the user to mobilize soft tissue, especially for sore muscle recovery. The user can, for example, dispense at least a portion of the personal care product from the container, and use the working feature of the container to break down sore muscle tissue without the need for extra lubricants or aromatherapy scents, while cleaning, treating or moisturizing themselves. Thus, the container is perfect for use of a personal care product after a workout or participation in a sporting activity.

Of course, the container need not conform identically to the shape and dimensions of a mobilization tool, but is expected to have at least one working feature, and preferably two, three or more working features, of a mobilization tool. For example, the container may be formed with an increased thickness, or depth, over known mobilization tools, thus providing improved structure for increased capacity of the personal care product held in a container. The preferred shape also has a broad beveled edge along at least a portion of a side, allowing for a larger surface area of the skin to be treated with each stroke.

The working features found on the container may include one or more of a teardrop shape portion extending from a portion, a tapered converging edge, and preferably a curved tapered converging edge, a converging opening where the sides of the opening diverge toward terminal ends, such as v-shaped notch, a bulbous extending portion, an inwardly arced portion, an elliptical shaped thumb cup, a generally triangular flattened blade, a levered pressure surface component, a massage edge, a blade edges, a disc edge, a pressure knob, a finger arc blade edge, a stripper, an adhesion release blade edge, a tendon release blade edge, a forearm arc blade edge, etc.

Preferably, the container includes an aperture for a handle to grasp the container adjacent or opposite a working feature, for efficient application of the working feature by the user.

BRIEF DESCRIPTION OF THE DRAWINGS

The present invention will be better understood when considered in view of the attached drawings, in which like reference characters indicate like parts. The drawings, however, are presented merely to illustrate the preferred embodiments of the invention without limiting the invention in any manner whatsoever.

DETAILED DESCRIPTION OF THE PREFERRED EMBODIMENT

Figure 1:
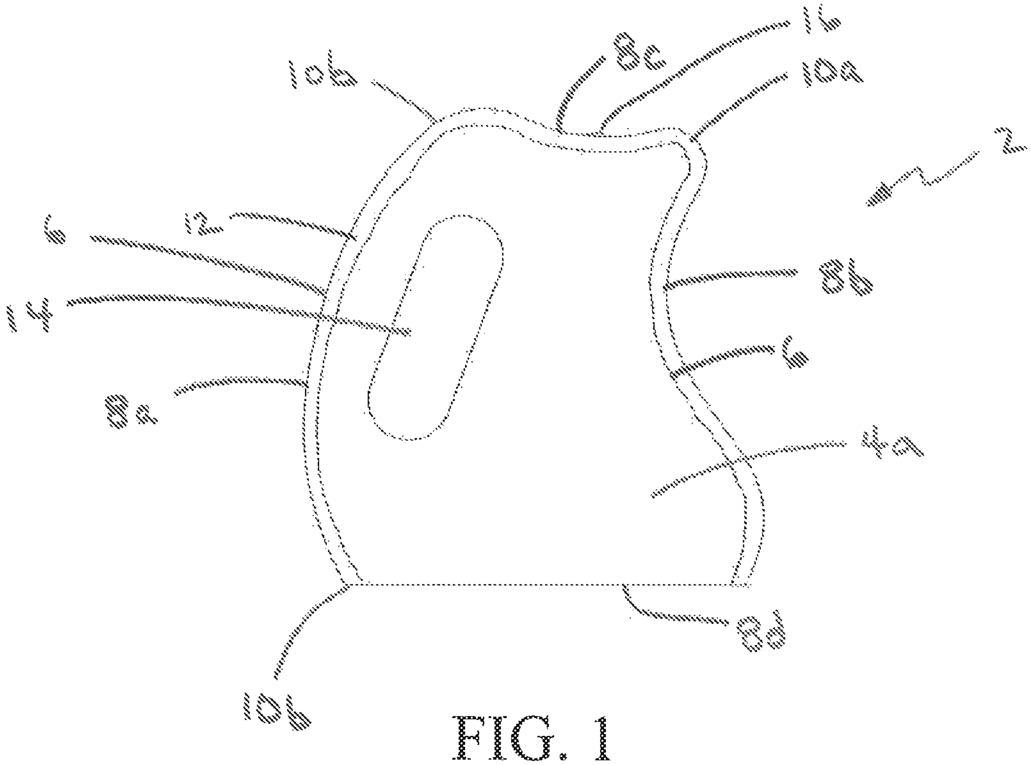
FIG. 1 is a front elevation of an embodiment of the container of the present invention.
Figure 2:
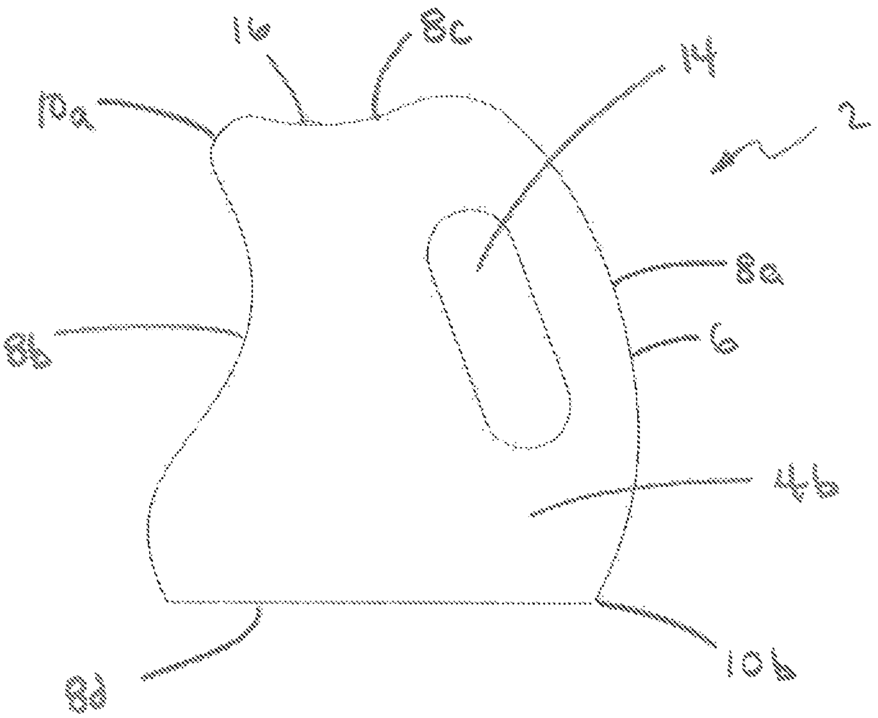
FIG. 2 is a rear elevation of the embodiment of the container shown in FIG. 1.
Figure 3:
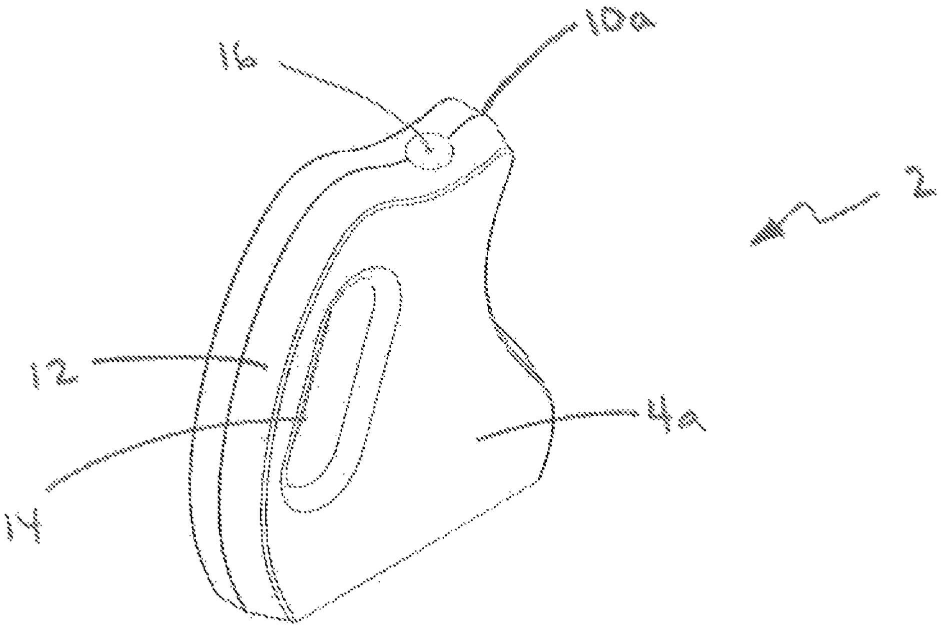
FIG. 3 is a perspective view of the embodiment of the container shown in FIG. 1.
Figure 4:
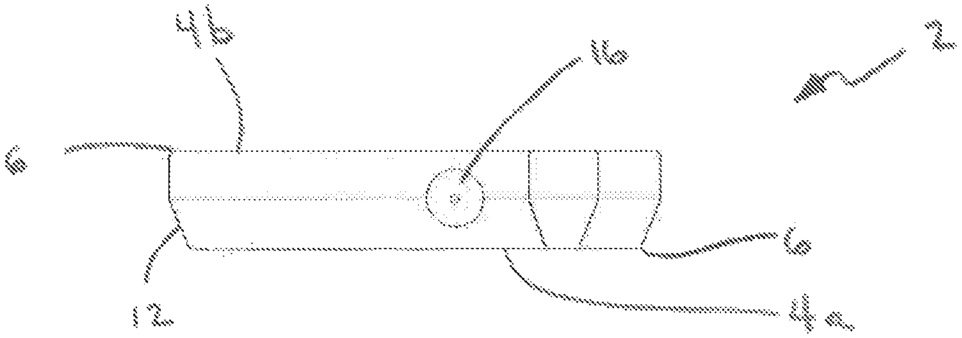
FIG. 4 is a top plan view of the embodiment of the container shown in FIG. 1.

The following description of the preferred embodiments is presented to describe the present invention without limiting the scope of the invention.

The present invention is directed to a container 2 for containing and dispensing a personal care product, the container 2 comprising a cavity 3 for holding the personal care product, an opening 16 for dispensing the personal care product, and at least one working feature for soft tissue mobilization.

As shown in each of the preferred embodiments illustrated, including a first embodiment generally shown in FIGS. 1-5 and an alternative embodiment generally shown in FIGS. 6-10, various corners and edges of the container 2 are designed for acting on various body parts. In this regard, the opening 16 for dispensing the personal care product held in the cavity 3 for the embodiment of FIGS. 1-5 is merely on a side or surface of the container 2, while the opening 16 for the embodiment of FIGS. 6-10 is incorporated into a corner 10*a* with a cap 18 covering the opening 16.

The preferred container 2 has opposed front surface 4*a* and rear surface 4*b*, each surface 4 comprising a body having a periphery 6 with a first end, a second end, a top and a bottom. The preferred container 2 also has four sides 8 including a left side 8*a*, a right side 8*b*, a top side 8*c* and a bottom side 8*d*, the sides 8 extending between said front 4*a* and rear 4*b* surfaces, providing a depth. As will be described later, one or more of the sides 8 comprise working features of the container 2.

In the preferred embodiments shown, the container 2 viewed at the front surface also has four corners 10, the corners 10 being at changes of direction in the sides 8 of the container 2 to form "nubs" that may comprise working features of the container 2. It is understood that the corners 10 may be rounded rather than sharp, and that the angles of the corners 10 are based on the sides 8 adjacent any rounded feature of the corner 10. One or more of these corners 10 comprise working features of the container 2.

Preferably, the container 2 has at least one peripheral section comprising a concave edge and at least one peripheral section comprising a convex edge. More preferred, the container 2 has at least two concave or convex peripheral portions, with two concave peripheral portions and a convex peripheral portion being most preferred. As shown in FIG. 1, the left side 8*a* comprises a convex peripheral portion, the right side 8*b* and top side 8*c* comprise concave peripheral portions and the bottom side 8*d* comprises a flat surface for standing the container 2 on a flat surface.

The preferred container 2 has at least one acute corner 10*a*, where the angle of the corner is less than 90 degrees, and at least one obtuse corner 10*b*, where the angle of the corner is greater than 90 degrees. It is understood that any combination of acute, obtuse, and even 90 degree corners may be used, limited only by geometry, including on containers 2 with more or less than four sides 8 having a different number of corners 10 with acute, obtuse or right angles. Moreover, notwithstanding the angle, it is understood that the corners 10 may be, and preferably are, at least partially rounded.

Additionally, the preferred container 2 has at least one side 8 that comprises a bevel 12, comprising an angled transition associated with at least a portion of one or more sides. As shown in FIGS. 1, 3, 4, 6, 9 and 10, the bevel 12 divides the side 8 between the front and rear surfaces with the side 8 divided between a 90 degree portion, which can be relative to the front or rear surface, and a beveled portion 12. Alternatively, the side 8 can comprise two bevels 12 forming an obtuse angle coming to a peak on the side 8, without a 90 degree portion. Also, the side 8 is shown as divided in the middle, however, any suitable division between the front 4a and rear 4*b* surfaces may be used.

In a preferred embodiment, the container 2 has at least one aperture 14 extending between the front 4*a* and rear 4*b* surfaces to assist in controlling the container 2 during soft tissue mobilization. It is preferred that the size and shape of the aperture 14 conforms to one or more of the user's fingers, and preferably all four fingers, so that the fingers and thumb wrap around the handle formed by the aperture 14 and the peripheral edge 6 of the container 2 adjacent the aperture 14. This permits the user to engage the aperture 14 to securely grasp the container 2, placing multiple fingers through the aperture 14 and having the palm of the hand rest against the adjacent side 8*a* of the container 2.

The benefits of the above described features are known to those skilled in the physical therapy art. In this regard, the preferred beveled edge 12, including a double beveled edge or a 90 degree beveled edge, allows for greater soft tissue activation, to aid in release of fascial restrictions. The greater activation on the soft tissue allows for shorter treatment times. Release of fascial restrictions lead to optimal muscle functioning.

The preferred concave sides 8*b* and 8*c* are directed toward global adhesions and general muscle aches. The convex side 8*a* is more aggressive and is geared towards localized specific adhesions and trigger points. The different sizes of both convex and concave edges are geared toward different size body parts. For example, the concave side 8*b* can be used for global adhesions on the Quadriceps or other large muscle groups. The convex side 8*a* can be used for local adhesions on the Biceps or other moderately sized muscle groups.

Figure 5:
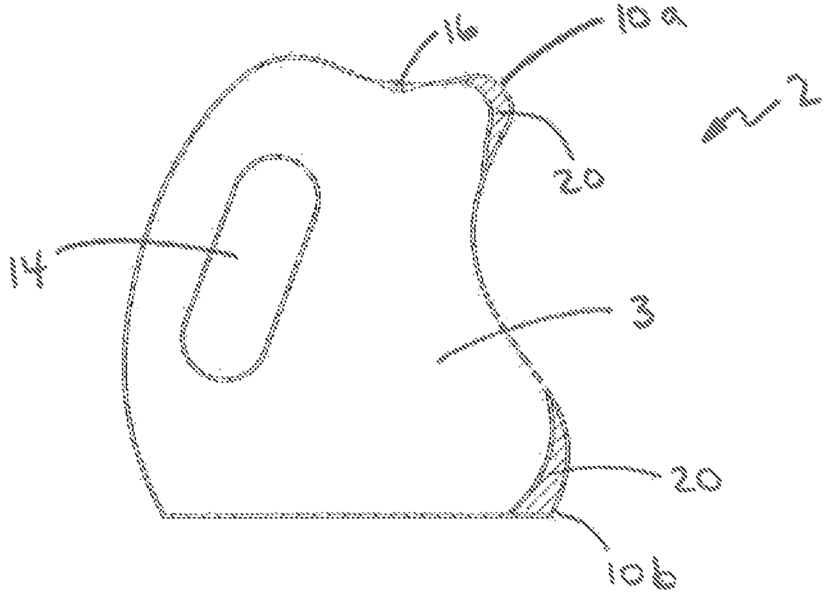
FIG. 5 is a cross-sectional elevation of the embodiment of the container shown in FIG. 1.
Figure 6:
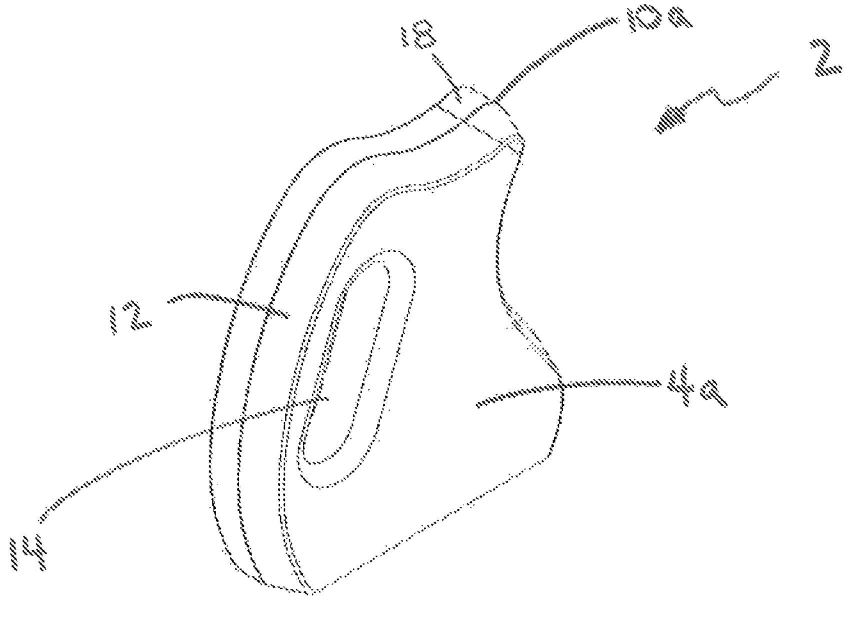
FIG. 6 is a perspective view of an alternative embodiment of the container of the present invention.
Figure 7:
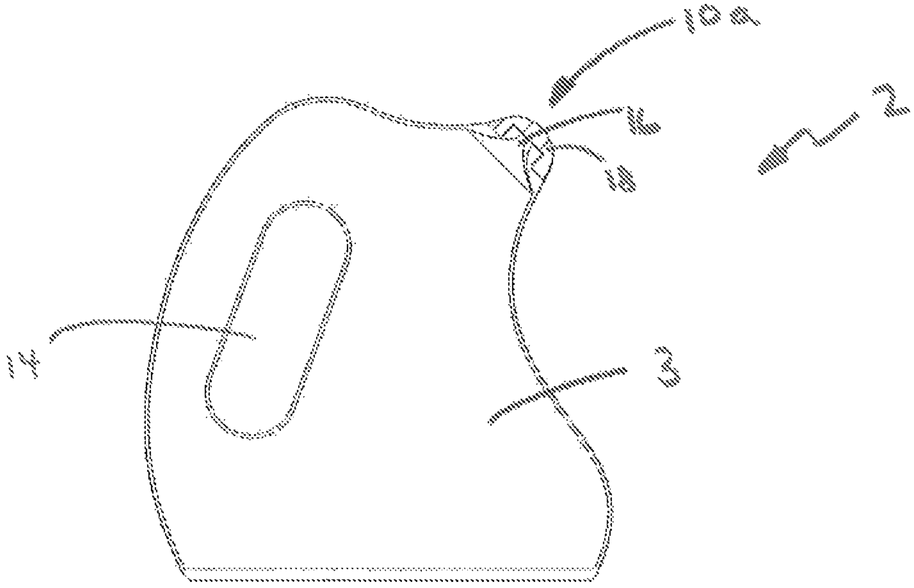
FIG. 7 is a cross-sectional elevation of the embodiment of the container shown in FIG. 6.

To facilitate the use of the container 2 as a soft tissue manipulation tool, one or more of the container walls may comprise a thickened wall 20 that provides greater strength to a related working feature. As shown in FIG. 5, the thickened wall 20 can be in the area of the acute corner 10*a* or an obtuse corner 10*b* to reduce the risk of the corner 10 collapsing with the application of force against a user's body when in use.

Figure 8:
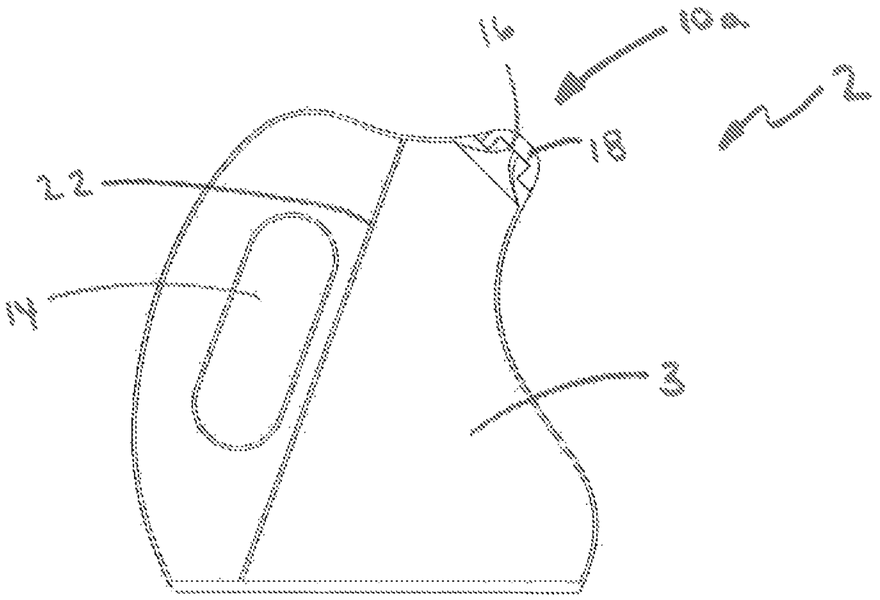
FIG. 8 is a cross-sectional elevation of the embodiment of the container shown in FIG. 1 including an internal wall.
Figure 9:
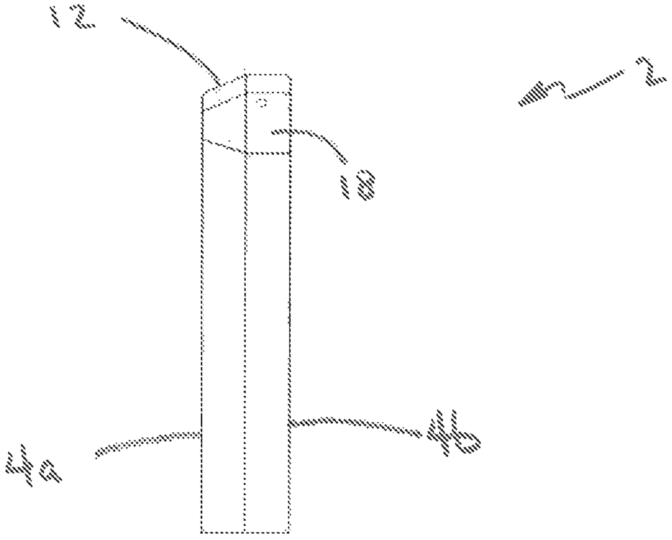
FIG. 9 is a side elevation of the embodiment of the container shown in FIG. 6.
Figure 10:
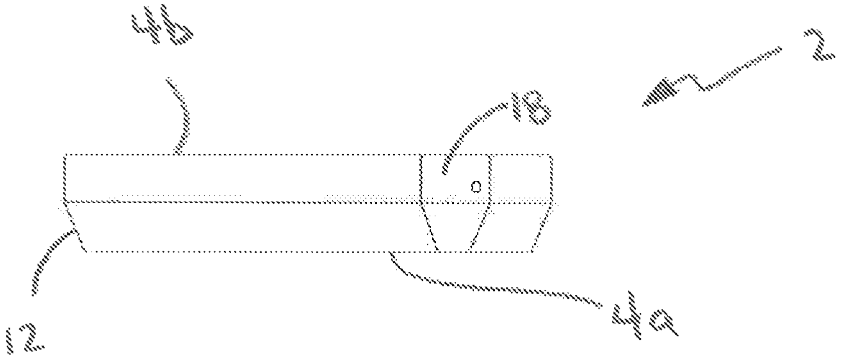
FIG. 10 is a top plan view of the embodiment of the container shown in FIG. 6.

In another embodiment, shown in FIG. 8, the volume of the cavity 3 can be limited by a wall 22 which reduces the contents of the personal care product held in the container. This is particularly useful when the personal care product is of high cost, such as when the cavity 3 contains a medicated product. In any event, the opening 16 is anticipated to be a resealable opening 16, however, a non-resealable opening can be used for a single use container 2.

In the most preferred embodiment, each side 8 and corner 10 of the container 2 can be utilized on the body. Even after the personal care product of container 2 is used, the container can still be utilized effectively on the body parts with a soap or lotion from a different source.

In addition to being the natural handle, the convex side 8*a* of the container 2 can be used like a rounded tool to work on larger muscle groups and body parts such as the calves, quadriceps and arms. The concave beveled edge 8*b* of the container 2 can be the primary part of the tool. This edge 8*b* can be very useful on a variety of muscle groups.

The acute nub or acute corner 10*a* on the upper right side of the container 2 shown in FIGS. 1, 3 and 5-8 is intended to be used on knotted muscles and trigger points on the body in the feet, neck, hands, forearms, shoulders, etc. The slightly larger acute corner 10*b* on the upper left side of the container 2 is intended to be used on knotted muscles and trigger points on the body in the legs, neck, hands, forearm, shoulders, etc. The concave right side 8*b* of the container 2 is intended to be used in the same fashion as the concave top side 8*c*, but can be utilized for slightly larger muscle areas in the quads, calves, and arms.

The container 2 can have any suitable dimensions, but preferably has a height dimension of about 6 to 45 cm, and more preferably from about 12 to 32 cm, a width dimension of from about 6 to 45 cm, and more preferably from about 12 to 32 cm, and a depth dimension of from about 1 to 12 cm, and more preferably from about 2 to 8 cm. The most preferred dimensions are a height of about 16 to 24 cm, a width of about 16 to 24 cm and a depth of about 3 to 7 cm.

In a preferred embodiment, the personal care product contained in the cavity 3 of container 2 comprises 1-5% Menthol, which has also been proven to decrease pain perception on a Visual Analog scale superior to ice. The combination of the shape of the container 2 and ingredients of the personal care product are designed to relieve fascial adhesions and muscular trigger points while at the same time creating a safe, therapeutic analgesic effect. This will allow for optimal healing and overall muscle recovery.

The preferred personal care product may also, or alternatively, comprise one or more essential oils, aromatherapy ingredients, CBD, moisturizers, etc., which work in conjunction with the IASTYM methodology to promote improved circulation, stimulation of neurologic pathways, health benefits, etc.

The container 2 can be used in the shower as part of one's bathing routine. A customer will take container 2, dispense a portion of the personal care product contained in the cavity through the resealable opening 16 and lather it up. It will immediately release the essential oils into the air, and the CBD, menthol, lavender oil, Roman chamomile or other active ingredients will begin being absorbed into the skin. Using downward strokes, at the appropriate angle, the user can repeatedly work the affected muscle area. After about 1-2 minutes the user can use the container 2 to cleanse or otherwise treat other parts of their body.

For example, a competitive soccer player with a sore right hip flexor can enter a warm shower, grasp the container 2 by the handle formed in connection with aperture 14, dispense a portion of the personal care product onto an affected area, and proceed to use the container 2 on the affected area. Employing about 25-50 strokes using the leading concave, preferably beveled edge 12 to break up the myofascial adhesions in the hip flexor, the user feels immediate relief from the combined action of the essential oils/menthol and longer term palliative response from the anti-inflammatory effects of the CBD. The muscle fiber can now recover more quickly.

The container 2 of the present invention takes the concept of soft-tissue mobilization therapy and blends it with a soap and/or personal care product to treat soft tissue dysfunction and provide preventative, proactive manual therapy. This aids in the user's relaxing tense muscles, reducing scar tissue, stretching fascia, lengthening fascia, cleaning skin, creating an aromatherapy response to promote health and wellness, reducing inflammation, etc.

While certain exemplary embodiments have been described and shown in the accompanying drawings, it is to be understood that such embodiments are merely illustrative and do not limit the current invention. Accordingly, this invention is not restricted to the specific constructions and arrangements shown and described since variation, modification, and/or alternatives can occur to those ordinarily skilled in the art. All such variations, modifications and/or alternatives are intended to fall within the scope of the present invention, and all patents, patent application publications, and references cited herein are hereby incorporated by reference.

The term "comprising" as used in the following claims is an open-ended transitional term that is intended to include additional elements not specifically recited in the claims. It is also noted that any feature or element positively identified in this document may also be specifically excluded as a feature or element of an embodiment of the present invention.

The invention claimed is:

1. A container for a personal care product that enhances activation of soft tissue when applied to an area of the soft tissue prior to activation with a working feature on the container, said container comprising a main body having a cavity at least partially bounded by a wall, said cavity configured to hold the personal care product, a single resealable opening for filling and dispensing the personal care product from the cavity of the container, a substantially flat front surface, a substantially flat rear surface, a first side extending between the front surface and the rear surface, a second side extending between the front surface and the rear surface opposite the first side, a plurality of working features configured for the activation of soft tissue, and an aperture extending from the substantially flat front surface through to the substantially flat rear surface, configured as a handle to control the container during soft tissue activation, wherein at least one working feature is on a corner of the main body, at least one working feature is on the first side of the main body comprising a smooth, arced convex peripheral portion extending along a majority of the first side, and at least one working feature is on the second side of the main body comprising an open, smooth, arced concave peripheral portion extending along a majority of the second side, at least a portion of each of the first side and the second side having an at least partially beveled edge along at least a portion of their respective smooth, arced peripheral portions between the front surface and the rear surface, and further wherein at least a portion of the aperture, the at least one working feature on a corner of the main body, the at least one working feature on the first side of the main body and the at least one working feature on the second side of the main body are on the wall bounding the cavity.

2. The container of claim 1 wherein the personal care product comprises a surfactant.

3. The container of claim 1 wherein the personal care product comprises a lubricant and an emollient.

4. The container of claim 1 wherein the personal care product comprises a fragrance.

5. The container of claim 1 wherein the personal care product comprises a medicament.

6. The container of claim 1 wherein the plurality of working features comprise, when looking at a front surface, at least one of a corner formed of an acute angle, a corner formed of an obtuse angle, a second side formed in a generally concave shape, a side formed in a generally convex shape, an at least partially beveled edge, a teardrop shape portion extending from a portion, a tapered converging edge, a converging opening where the sides of the opening diverge toward terminal ends in a notch, a bulbous extending portion, an inwardly arced portion, an elliptical shaped thumb cup, a generally triangular flattened blade, a levered pressure surface component, a massage edge, a blade edge, a disc edge, a pressure knob, a finger arc blade edge, a stripper, an adhesion release blade edge, a tendon release blade edge, a forearm arc blade edge, combinations thereof and multiples of one or more thereof.

7. The container of claim 6 wherein the at least partially beveled edge comprises a 90 degree portion and a beveled portion.

8. The container of claim 1 wherein the at least one working feature on a corner of the main body, when looking at a front surface, is taken from the group consisting of an acute angle and an obtuse angle.

9. The container of claim 8 wherein the aperture configured as a handle is surrounded by the cavity.

10. The container of claim 1 wherein the aperture configured as a handle is surrounded by the cavity.

11. The container of claim 1 wherein the plurality of working features comprise, when looking at a front surface, two corners formed of an acute angle, two corners formed of an obtuse angle, two sides formed in a generally concave shape, and one side formed in a generally convex shape.

12. The container of claim 1 wherein the aperture configured as a handle aligns with and is positioned closer to a side formed in a generally convex shape than an opposed side comprising the concave peripheral portion.

13. The container of claim 1 wherein the resealable opening is incorporated into at least one of the working features.

14. The container of claim 1 wherein at least a portion of the wall bounding the cavity is thicker in at least an area of at least one of the plurality of working features than other portions of the wall.

15. The container of claim 1 wherein the resealable opening is covered by a cap.

16. The container of claim 15 wherein the cap is incorporated into a corner and comprises a portion of at least one of the plurality of working features.

17. The container of claim 1 wherein all of the plurality of working features are only manually activated, without any mechanical activation components.

* * * * *